US005834154A

United States Patent [19]

Yamazaki et al.

[11] Patent Number: 5,834,154

[45] Date of Patent: Nov. 10, 1998

[54] THERMAL TRANSFER IMAGE-RECEIVING SHEET

[75] Inventors: Masayasu Yamazaki; Satoru Kawai; Kenichiro Suto, all of Tokyo-To, Japan

[73] Assignee: Dai Nippon Printing Co., Ltd., Japan

[21] Appl. No.: 773,414

[22] Filed: Dec. 27, 1996

[30] Foreign Application Priority Data

Dec. 28, 1995 [JP] Japan .................................... 7-352193

[51] Int. Cl.[6] ................................ G03C 8/26; D06P 5/00; G01D 9/00

[52] U.S. Cl. .............................. 430/201; 430/941; 8/471; 503/227

[58] Field of Search .................................... 430/201, 941; 8/471; 503/227

[56] References Cited

U.S. PATENT DOCUMENTS

| | | | |
|---|---|---|---|
| 4,740,497 | 4/1988 | Harrison et al. | 8/471 |
| 5,198,410 | 3/1993 | Martin | 430/201 |
| 5,290,660 | 3/1994 | Eian et al. | 430/201 |
| 5,296,447 | 3/1994 | Suto et al. | 503/227 |

FOREIGN PATENT DOCUMENTS

| | | |
|---|---|---|
| 0 228 066 A2 | 7/1987 | European Pat. Off. . |
| 0 228 066 A3 | 7/1987 | European Pat. Off. . |
| 0 386 262 A1 | 9/1990 | European Pat. Off. . |
| 0 546 436 A1 | 6/1993 | European Pat. Off. . |

OTHER PUBLICATIONS

Patent Abstracts of Japan—Publ. No. 02095890; Publ. Date: Apr. 6, 1990; Appl. No. 63247397; Appl. Date: Oct. 3, 1988; Applicant: Ricoh Co. Ltd.; Inventors: Kamimura Hiroyuki et al.; Title: Image Receiving Material for Sublimation Transfer.

Research Disclosure—No. 334, Feb. 1, 1992, pp. 155–159, XP000291266; Defieuw G. et al.; "Thermal Dye Sublimation Transfer"; p. 155–p. 156; p. 158, paragraph 4; p. 159, paragraph 4.

*Primary Examiner*—Richard L. Schilling
*Attorney, Agent, or Firm*—Parkhurst & Wendel, L.L.P

[57] ABSTRACT

A thermal transfer image-receiving sheet comprising a substrate sheet, a dye-receptive layer provided on at least one surface of the substrate sheet, and a backing layer provided on the other surface of the substrate sheet, wherein the dye-receptive layer contains polycaprolactone.

12 Claims, No Drawings

THERMAL TRANSFER IMAGE-RECEIVING SHEET

BACKGROUND OF THE INVENTION

1. Field of the Invention

The present invention relates to an image-receiving sheet useful for heat-sensitive transfer recording, and, more specifically, to a thermal transfer image-receiving sheer for use in the sublimation transfer recording process, capable of producing high-density images without suffering from the matting of the surface of its dye-receptive layer even when high-speed and high-energy printing is carried out.

2. Background Art

Heretofore, a variety of thermal transfer recording processes have been known. Of these, the sublimation transfer recording process is attracting attention, and utilized as an information recording means in various fields in recent years. In this recording process, a thermal transfer printing sheet composed of a substrate such as a polyester film, and a thermal transfer printing layer provided thereon, comprising a sublimable dye is heated by a heating medium such as a thermal head or laser to transfer the dye to a thermal transfer image-receiving sheet, thereby producing an image on the image-receiving sheet.

By this sublimation transfer recording process, a high-quality full-colored image excellent in the reproducibility and gradation of half tone, comparable to a full-colored photographic image can be produced in an extremely short time.

Further, in this recording process, an image is formed when a resin contained in the dye-receptive layer of the image-receiving sheet is dyed with the sublimable dye. Therefore, this recording process is advantageous in that it can produce an extremely sharp and highly transparent image. For this reason, the sublimation transfer recording process is now being extensively employed to make color transparencies for use with a projector such as an over head projector (hereinafter abbreviated to "OHP").

A thermal transfer image-receiving sheet for use with an OHP is generally composed of a dye-receptive layer provided on one surface of a transparent substrate sheet having a thickness of approximately 100 $\mu$m, made from polyethylene terephthalate (hereinafter referred to as "PET") or the like, and a backing layer provided on the other surface of the substrate sheet.

Specifically, on the image-receiving surface of such a thermal transfer image-receiving sheet, a dye-receptive layer comprising a thermoplastic resin such as a saturated polyester resin, a vinyl chloride/vinyl acetate copolymer or a polycarbonate resin is provided in order to receive a sublimable dye transferred from a thermal transfer printing sheet and to sustain the image produced. An intermediate layer may also be provided, when necessary.

There is a case where a layer capable of imparting cushioning properties is provided as the intermediate layer when the substrate sheet of the thermal transfer image-receiving sheet is made from a material having high rigidity such as PET. There is also a case where a layer capable of imparting antistatic properties is provided as the intermediate layer.

On the other surface of the substrate sheet, a backing layer may be provided by coating a composition which comprises a binder such as an acrylic resin, and an organic filler such as an acrylic, fluoro- or polyamide resin or an inorganic resin such as silica in order to prevent the image-receiving sheet from being curled or to impart improved slip properties to the image-receiving sheet.

An image produced on a so-called standard-type thermal transfer image-receiving sheet is viewed not be transmitted light but by reflected light. An image-receiving sheet of this type also has almost the same constitution as that of the above-described image-receiving sheet except that an opaque material such as a white PET film, an expanded PET sheet, other plastic sheet, natural paper, synthetic paper, or a laminate thereof is used as the substrate sheet.

In recent years, as the printing speed of a thermal transfer printer is increased, there has been brought about such a problem that an image having a sufficiently high density cannot be obtained when a conventional thermal transfer printing material is used. In order to obtain an image having a sufficiently high density, it is necessary to increase the printing sensitivity of the dye-receptive layer, or to apply an increased amount of energy when printing is conducted. The printing sensitivity of the dye-receptive layer can be increased by adding a sensitizer, particularly a plasticizer, to the dye-receptive layer.

The plasticizer includes those ones which are usually used for vinyl chloride resins; for example, monomeric plasticizers such as phthalic esters, phosphoric esters, adipic esters and sebacic esters, and polyester plasticizers which can be obtained by the polymerization between adipic acid, sebacic acid or the like and propylene glycol or the like. However, these plasticizers have low-molecular weights (from several hundreds to several thousands), and are generally in a liquid state. Therefore, when such a plasticizer is added, the dye-receptive layer tends to undergo a change with time. In addition, the dye-receptive layer is readily deformed by heat, so that the surface thereof tends to be matted (roughened) by being damaged by heat when printing is conducted.

Further, there has also been a problem that the surface of the dye-receptive layer corresponding to a high density area is matted by being damaged by heat when an increased amount of energy is applied when printing is conducted. In the case of a transmission-type thermal transfer image-receiving sheet for use with an OHP or the like, an image to be printed thereon is required to have a high density so that it can show satisfactory dynamic range (three-dimensional feel, aesthetic effects, etc.) when projected. Therefore, a more increased amount of energy is applied to obtain the high density area of the image, so that the surface of the dye-receptive layer corresponding to such an area is remarkably matted. Transmitted or reflected light thus scatters at the matted surface when the image is projected by using an OHP, and the projected image looks darkened.

Furthermore, there is also a case where an image having a required density cannot be obtained because a sufficiently large amount of energy cannot be applied to a thermal transfer image-receiving sheet for use with an OHP, or that of standard type in order to prevent the above-described matting of the dye-receptive layer thereof.

In addition, the thermal transfer image-receiving sheet has such a shortcoming that it tends to be curled due to heat or pressure applied thereto by a thermal transfer printer when printing is conducted, or heat generated by the light source of an OHP, or the temperature conditions under which it is stored.

Another problem is that a thermal transfer image-receiving sheet cannot run without failure, or attracts dust during the production thereof due to static electricity generated thereon. Still another problem is that a thermal transfer image-receiving sheet cannot be successfully fed to a thermal transfer printer; for instance, double feed is caused when sheets of the image-receiving sheet are fed to a printer.

It is therefore an object of the present invention to provide a thermal transfer image-receiving sheet that can produce an image having a high density without suffering from the matting of the surface of its dye-receptive layer even when high-speed and high-energy printing is conducted, which is free from curling and which has excellent feeding properties (can be fed to a printer without causing any problem).

SUMMARY OF THE INVENTION

It has now been found that the above object can be achieved by a thermal transfer image-receiving sheet comprising a substrate sheet, a dye-receptive layer provided on at least one surface of the substrate sheet, and a backing layer provided on the other surface of the substrate sheet, wherein the dye-receptive layer contains polycaprolactone.

According to the present invention, due to the use of polycaprolactone in the dye-receptive layer, the surface of the dye-receptive layer is effectively prevented from being matted even when a large amount of energy is applied thereto when printing is conducted. Accordingly, the thermal transfer image-receiving of the present invention can produce a high-density image which looks neither darkened nor unnaturally matted when projected by an OHP.

DETAILED DESCRIPTION OF THE INVENTION

Substrate Sheet

The substrate sheet serves to sustain the dye-receptive layer provided thereon. It is desirable that the substrate sheet be fully resistant to heat which is applied when an image is printed and that the mechanical properties of the substrate sheet be excellent enough for the handling of the image-receiving sheet. There is no particular limitation on the material of such a substrate sheet, and a film of any of the following material can be used as the substrate sheet: polyester, polyacrylate, polycarbonate, polyurethene, polyimide, polyether imide, cellulose derivatives, polyethylene, ethylene/vinyl acetate copolymers, polypropylene, polystyrene, acrylic resins, polyvinyl chloride, polyvinylidene chloride, polyvinyl alcohol, polyvinyl butyral, nylon, polyether ether ketone, polysulfone, polyether sulfone, tetrafluoroethylene/perfluoroalkylvinyl ether, polvinyl fluoride, tetrafluoroethylene/ethylene, tetrafluoroethylene/-hexafluoropropylene, polychlorotrifluoroethylene, polyvinylidene fluoride and the like. In order to make a thermal transfer image-receiving sheet for use with an OHP, a transparent sheet is selected from films of the above-enumerated materials, and used as the substrate sheet.

In order to make a standard-type thermal transfer image-receiving sheet, any of the following materials can be used as the substrate sheet; the material mentioned previously, a white film or expanded sheet obtained by using a composition prepared by adding a white pigment or filler to any of the above synthetic resins, condenser paper, glassine paper, parchment paper, synthetic paper (polyolefin type, polystyrene type), high-grade paper, art paper, coated paper, cast-coated paper, paper impregnated with a synthetic resin or emulsion, paper impregnated with a synthetic rubber latex, paper containing a synthetic resin, cellulose fiber paper and the like.

Further, a laminate of the above-described materials in any combination can also be used as the substrate sheet. Typical examples of such a laminate include a laminate of cellulose fiber paper and synthetic paper, and a laminate of cellulose fiber paper and a plastic film.

Furthermore, a sheet of any of the above-described materials, whose one or both surfaces are so treated that other layer can easily be adhered thereto can also be used as the substrate sheet.

In the present invention, it is preferable to select, from the above-described substrate sheets, one which can show a surface electric resistivity of $1.0\times10^{12}$ Ω/□ or less at a temperature of 20° C. and a relative humidity of 50%, or to subject a substrate sheet to antistatic treatment so that it can show a surface electric resistivity in the above-described range. By the use of such a substrate sheet, it is possible to overcome those troubles that will be caused due to static electricity generated during the production of a thermal transfer image-receiving sheet. In addition, the effects of an antistatic agent which may be incorporated into the image-receiving surface and back surface of the thermal transfer image-receiving sheet can be promoted as will be described later in a preferred embodiment of the present invention.

The thickness of the substrate sheet is, in general, approximately 3 to 300 micrometers. In the present invention, it is preferable to use a substrate sheet having a thickness of 75 to 175 micrometers in consideration of mechanical suitability and the like. Further, it is also preferable to subject the surface of the substrate sheet to adhesion-promoting treatment or corona discharge treatment when the adhesion between the substrate sheet and a layer provided thereof is insufficient.

Dye-Receptive Layer

According to the present invention, the dye-receptive layer contains polycaprolactone preferably having a molecular weight of 40,000 to 100,000. It is preferable that the main component of the dye-receptive layer be a vinyl chloride resin or a vinyl chloride/vinyl acetate copolymer.

By the use of polycaprolactone which is highly compatible especially with a vinyl chloride resin or a vinyl chloride/vinyl acetate copolymer, which can serve as a plasticizer, which undergoes no change with time unlike conventional liquid plasticizers, and which preferably has a molecular weight of 40,000 to 100,000, it is possible to prevent the matting of the surface of the dye-receptive layer, which will be caused when high-energy printing is carried out. When polycaprolactone having a molecular weight of less than 40,000 is used, the resulting dye-receptive layer tends to be matted when high-energy printing is conducted. On the other hand, when polycaprolactone having a molecular weight of more than 100,000 is used, good results may be obtained in terms of matting and printing sensitivity. However, polycaprolactone having such a high molecular weight cannot be stably produced at present.

The polycaprolactone can be added in an amount of up to approximately 100% by weight of the resin used. However, it is preferable to add the polycaprolactone in an amount of 60% by weight or less of the resin when the storage stability of the image-receiving sheet on which an image has been printed is taken into consideration. The polycaprolactone should be used in an amount of at least 5% by weight, preferably at least 10% by weight of the resin. It is also possible to use the polycaprolactone together with a conventional liquid plasticizer, when necessary. However, in this case, it is desirable to use the conventional liquid plasticizer in such an amount that the advantageous effects of the present invention will not be marred.

In the thermal transfer image-receiving sheet of the present invention, the dye-receptive layer can also be formed by using a mixture of the above-described components and other thermoplastic resin. Examples of such a thermoplastic resin include polyolefin resins such as polypropylene, halogenated polymers such as polyvinylidene chloride, vinyl resins such as polyvinyl acetate, ethylene/vinyl acetate copolymers and polyacrylate, polyester resins, polystyrene resins, polyamide resins, olefin/vinyl monomer copolymeric resins, ionomers, cellulose resins such as cellulose diacetate, polycarbonate resins, polyvinyl acetal resins and polyvinyl alcohol resins. In the case where such a resin is used for a thermal transfer image-receiving sheet which is required to have transparency, such as one for use with an OHP, it is necessary to select a resin which is highly compatible with the previously-mentioned resin used as a main component.

In addition, a variety of additives can also be added to the dye-receptive layer as needed. For instance, a releasing agent can be added so that a thermal transfer printing sheet and the thermal transfer image-receiving sheet will not be thermally fused with each other when printing is conducted. A catalyst-hardening silicone, or a reaction-hardening silicone which is a combination of an amino-modified silicone and an epoxy-modified silicone is particularly preferred as the releasing agent. Such a releasing agent may be added in an amount of 0.5 to 10% by weight of the resin used.

Further, in order to further increase the sharpness of a transfer-printed image by increasing the whiteness of the dye-receptive layer, a pigment or filler such as titanium oxide, zinc oxide, kaolin, clay, calcium carbonate or finely-particulate silica can also be added to the dye-receptive layer. In order to make a thermal transfer image-receiving sheet which is required to have transparency, such as one for use with an OHP, such a pigment or filler may be added in which an amount that the transparency required will not be lost.

A coating liquid for forming dye-receptive layer is prepared by adding the previously-described resin and polycaprolactone, and, when necessary, the above-described additives to a proper solvent or diluent, and thoroughly kneading the mixture. The coating liquid thus prepared is coated onto the surface of the above-described substrate sheet by the gravure printing method, screen printing method, reverse-roll coating method using a gravure, or the like, and then dried to form the dye-receptive layer.

An intermediate layer, a backing layer, an adhesion-promoting layer and an antistatic layer, which will be described later, are also formed in the same manner as the above-described manner for forming the dye-receptive layer.

In order to impart antistatic properties to the dye-receptive layer, it is also possible to incorporate any of the following antistatic agents into the coating liquid for forming dye-receptive layer.

Antistatic agents: fatty esters, sulfuric esters, phosphoric esters, amides, quaternary ammonium salts, betaines, amino acids, acrylic resins, ethylene oxide adducts, etc.

Such an antistatic agent may be incorporated into the dye-receptive layer in an amount of 0.1 to 2.0% by weight of the resin.

In order to make a thermal transfer image-receiving sheet of the present invention, it is preferable that the coating liquid for forming dye-receptive layer be coated onto the substrate sheet in an amount of 0.5 to 4.0 $g/m^2$ on dry basis. When the coating liquid is coated onto the substrate sheet in an amount of less than 0.5 $g/m^2$ on dry basis so as to directly provide a dye-receptive layer on the substrate sheet, the resulting dye-receptive layer cannot be brought into close contact with a thermal head due to the rigidity of the substrate sheet, or the like. As a result, the high-light area of the printed image is roughened. This problem can be solved by providing an intermediate layer capable of imparting cushioning properties. However, in this case, the dye-receptive layer loses its scratch resistance. Further, as the coating amount of the coating liquid for forming dye-receptive layer is increased, the relative degree of the surface roughening of the dye-receptive layer tends to become high when a large amount of energy is applied. When the coating liquid is coated in an amount of more than 4.0 $g/m^2$ on dry basis, the high-density area of the image projected by an OHP looks slightly darkened.

The amounts coated (or applied) described hereinafter mean weights on dry basis, calculated in terms of solid matter, unless otherwise specified.

Intermediate Layer

In the present invention, an intermediate layer made from various thermoplastic resins can also be provided between the substrate sheet and the dye-receptive layer. By providing an intermediate layer having various functions, it is possible to impart excellent properties to the thermal transfer image-receiving sheet.

For example, when an intermediate layer is provided by using a resin capable of inparting cushioning properties, such as a resin showing large elastic or plastic deformation, for instance, a polyolefin, vinyl copolymer, polyurethane or polyamide resin, the resulting thermal transfer image-receiving sheet has increased printing sensitivity. Moreover, the roughening of a printed image can be prevented. When an intermediate layer is provided by using a resin having a glass transition temperature of 60° C. or higher, or a crosslinked resin obtained by using a crosslinking agent, sheets of the thermal transfer image-receiving sheet do not adhere to each other even when they are stored in piles. The storage stability of the thermal transfer image-receiving sheet can thus be improved.

Further, in order to impart antistatic properties to the thermal transfer image-receiving sheet by providing an intermediate layer, a coating liquid which is prepared by dissolving or dispersing in a solvent the above-described resin and an antistatic agent or a resin having antistatic properties may be used.

Examples of the antistatic agent include fatty esters, sulfuric esters, phosphoric esters, amides, quaternary ammonium salts, betaines, amino acids, acrylic resins, ethylene oxide adducts, etc.

Examples of the resin having antistatic properties include conductive resins obtained, for example, by introducing a group having antistatic activity such as a quaternary ammonium salt, phosphoric acid, ethosulfate, vinyl pyrrolidone or sulfone into a resin such as an acrylic, vinyl or cellulose resin, or by copolymerizing a group having antistatic activity with such a resin. Cation-modified acrylic resins are particularly preferred.

It is preferable to introduce a group having antistatic activity into the above-described resin in a pendent state. This is because, when such a group is introduced into the resin in this manner, the density of the group in the resin can be made high. Specific examples of such a resin include a series of resins available from Nihon Junyaku Co., Ltd. under the trademark of "Jurimer"; a series of resins available from Dai-Ichi Kogyo Seiyaku Co., Ltd. under the trademark of "Leox"; and a series of resins available from Soken Chemical Co., Ltd. under the trademark of "Elecond".

Backing Layer

A backing layer is provided on the surface of the substrate sheet, opposite to the surface on which the dye-receptive layer is provided, in order to impart improved feeding properties to the thermal transfer image-receiving sheet, and to prevent the curling of the image-receiving sheet. As a resin for the backing layer, use may be made of, e.g., an acrylic, cellulose, polycarbonate, polyvinyl acetal, polyvinyl alcohol, polyamide, polystyrene or polyester resin, or a halogenated polymer. Of these resins, acrylic resins are preferred, and acrylic polyols are most preferred. Further, it is preferable to use an acrylic polyol cured by using a curing agent.

A typical example of acrylic polyols is a polymer of ethylene glycol methacrylate, $CH_2=C(CH_3)COOCH_2CH_2OH$. Besides this polymer, a polymer having a monomer unit of the above formula in which the ethylene glycol moiety is replaced with propylene glycol, trimethylene glycol, butanediol, pentanediol, hexanediol, cyclopentanediol, cyclohexanediol or glycerin can also be used. Of these, an ethylene glycol methacrylate polymer, a propylene glycol methacrylate polymer, and a polymer of ethylene glycol methacrylate and propylene glycol methacrylate are preferred.

An acrylic polyol having 15 to 55, particularly 20 to 45 OH groups is preferred. An acrylic polyol having less than 15 OH groups is poor in both heat resistance and solvent resistance. In addition, it will take a long time to cure such an acrylic polyol. On the other hand, when an acrylic polyol having more than 55 OH groups is used in a coating liquid for forming backing layer, the pot life of the coating liquid becomes short, and the backing layer film formed by using this coating liquid is brittle. An acrylic polyol having a preferable number of OH groups can produce a backing layer which is almost free from thermal shrinkage. A thermal transfer image-receiving sheet provided with such a backing layer is therefore free from deformation, in particular, curling which will be caused due to heat applied by a thermal head when thermal transfer printing is conducted. Such an acrylic polyol is also advantageous in that it can fully retain additives such as a filler and that it is highly adherent to the substrate sheet.

It is also possible to add 5 to 50 parts by weight of the above-described resins other than the acrylic polyol to 100 parts by weight of the acrylic polyol.

As the curing agent, any known curing agent can be used, however, an isocyanate compound is particularly preferred. When the backing layer resin is reacted with an isocyanate compound or the like, a urethane bond is formed, and the resin is thus cured to take a three-dimensional structure. The resulting backing layer has improved high-temperature storage stability band solvent resistance, and also increased adhesion to the substrate sheet. It is preferable to use the curing agent in 1 to 2 equivalent amount for 1 equivalent amount of a reactive group in the resin. When the curing agent is added in an equivalent amount of less than 1, it will take a long time to completely cure the resin, and the resulting backing layer has decreased heat resistance and solvent resistance. On the other hand, when the curing agent is added in an equivalent amount of more than 2, the resulting backing layer undergoes a change with time, and the pot life of the coating liquid used for forming the backing layer is short.

An organic or inorganic filler can be incorporated, as an additive, into the above-described backing layer. Thanks to such a filler, the feeding properties of the thermal transfer image-receiving sheet can be improved. In addition, the image-receiving sheet has improved storage stability; for instance, blocking is prevented.

Examples of the organic filler which can be incorporated into the backing layer include acrylic fillers, polyamide fillers, fluorofillers and polyethylene waxes. Of course, polyamide fillers are particularly preferred. Examples of the inorganic fillers include silicon dioxide and metallic oxides.

Among polyamide fillers, one having a molecular weight of 100,000 to 900,000, consisting of spherical particles having an average particle diameter of 0.01 to 30 micrometers is preferred; and one having a molecular weight of 100,000 to 500,000, consisting of spherical particles having an average particle diameter of 0.01 to 10 micrometers is more preferred. With respect to the type of polyamide fillers, nylon 12 filler is more preferable than nylon 6 or nylon 66 filler. This is because nylon 12 is excellent in water resistance as compared with nylon 6 and nylon 66, and free from any change in the properties thereof, which will be caused due to water absorbed.

The polyamide fillers have high melting points, are thermally stable and excellent in resistance to oils and to chemicals, and are hardly dyed with a dye. In particular, a polyamide filler having a molecular weight of 100,000 to 900,000 is scarcely abraded, and has self-lubricity. The friction coefficient of such a polyamide filler is low, so that the filter scarcely damages one which is brought into contact therewith.

A polyamide filler having an average particle diameter of 0.1 to 30 micrometers is preferably used for a thermal transfer image-receiving sheet of reflection type. A polyamide filler having an average particle diameter of 0.01 to 1 $\mu$m is preferably used for a thermal transfer image-receiving sheet of transmission type (an image-receiving sheet for use with an OHP). When a polyamide filler having a particle diameter which is too small is added to the backing layer, it is hidden in the backing layer, so that the backing layer tends to have poor slip properties. On the other hand, when a polyamide filler having a particle diameter which is too large is added to the backing layer, the filler greatly protrudes from the backing layer. As a result, the friction coefficient of the backing layer is increased, and the filler tends to fall off the backing layer.

The filler may be incorporated into the backing layer in an amount of 0.01 to 200% by weight of the resin used. In the case of a thermal transfer image-receiving sheet of reflection type, it is more preferable that the filler be incorporated into the backing layer in an amount of 1 to 100% by weight of the resin used. In the case of a thermal transfer image-receiving sheet of transmission type, it is more preferable that the filler be incorporated into the backing layer in an amount of 0.05 to 2% by weight of the resin used. When the amount of the filler incorporated is less than 0.01% by weight of the resin, the resulting image-receiving sheet cannot have sufficiently high slip properties. As a result, the image-receiving sheet tends to jam in a printer at the time when it is fed to the printer. On the other hand, when the amount of the filler incorporated is in excess of 200% by weight of the resin used, the resulting image-receiving sheet has excessively high slip properties. As a result, the image-receiving sheet slips in a printer, and the image printed thereon tends to have color drift.

Adhesion-Promoting Layer

An adhesion-promoting layer comprising an adhesive resin such as an acrylate, polyurethane or polyester resin may be provided on the surface and/or back surface of the substrate sheet by means of coating. Instead of providing such an adhesion-promoting layer, it is also possible to subject the surface and/or back surface of the substrate sheet to corona discharge treatment in order to enhance the adhesion between the substrate sheet and a layer to be provided thereon.

Antistatic Layer

An antistatic layer may be provided on the surface and/or back surface of the substrate sheet, or on the outermost surface of the image-receiving surface and/or of the other surface of the thermal transfer image-receiving sheet. The antistatic layer can be formed by coating a coating liquid which is prepared by dissolving or dispersing in a solvent an antistatic agent selected from fatty esters, sulfuric esters, phosphoric esters, amides, quaternary ammonium salts, betaines, amino acids, acrylic resins, ethylene oxide adducts and the like.

It is preferable that the coating liquid be coated in an amount of 0.001 to 0.1 g/m$^2$.

A thermal transfer image-receiving sheet having such an antistatic layer on the outermost surface thereof shows excellent antistatic properties before an image is printed thereon. Therefore, troubles in the feeding of sheets, such as double feed is prevented. In addition, those troubles which will be caused due to dust attracted, such as voids in the printed image can be prevented.

EXAMPLES

The present invention will now be explained more specifically by referring to the following Examples and Comparative Examples.

The following coating liquids were prepared prior to the production of thermal transfer image-receiving sheets.

| | |
|---|---|
| (Coating Liquid 1 for Forming Dye-Receptive Layer) | |
| Vinyl chloride/vinyl acetate copolymer resin ("#1000AKT" manufactured by Denki Kagaku Kogyo K.K.) | 85 parts by weight |
| Polycaprolactone (molecular weight: 70,000) ("PLACCEL H-7" manufactured by Dicel Chemical Industries, Ltd.) | 15 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 2 for Forming Dye-Receptive Layer) | |
| Vinyl chloride/vinyl acetate copolymer resin ("#1000AKT" manufactured by Denki Kagaku Kogyo K.K.) | 70 parts by weight |
| Polycaprolactone (molecular weight: 70,000) ("PLACCEL H-7" manufactured by Dicel Chemical Industries, Ltd.) | 30 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 3 for Forming Dye-Receptive Layer) | |
| Vinyl chloride/vinyl acetate copolymer resin ("#1000MT2" manufactured by Denki Kagaku Kogyo K.K.) | 70 parts by weight |
| Polycaprolactone (molecular weight: 70,000) ("PLACCEL H-7" manufactured by Dicel Chemical Industries, Ltd.) | 30 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 4 for Forming Dye-Receptive Layer) | |
| Vinyl chloride/vinyl acetate copolymer resin ("#1000AKT" manufactured by Denki Kagaku Kogyo K.K.) | 70 parts by weight |
| Polycaprolactone (molecular weight: 40,000) ("PLACCEL H-4" manufactured by Dicel Chemical Industries, Ltd.) | 30 parts by weight |

-continued

| | |
|---|---|
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 5 for Forming Dye-Receptive Layer) | |
| Vinyl chloride/vinyl acetate copolymer resin ("#1000AKT" manufactured by Denki Kagaku Kogyo K.K.) | 100 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 6 for Forming Dye-Receptive Layer) | |
| Vinyl chloride/vinyl acetate copolymer resin ("#1000MT2" manufactured by Denki Kagaku Kogyo K.K.) | 100 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 7 for Forming Dye-Receptive Layer) | |
| Vinyl chloride/vinyl acetate copolymer resin ("#1000AKT" manufactured by Denki Kagaku Kogyo K.K.) | 70 parts by weight |
| Plasticizer (dioctyl phthalate, "DOP" for short) | 30 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid 8 for Forming Dye-Receptive Layer) | |
| Vinyl chloride/vinyl acetate copolymer resin ("#1000AKT" manufactured by Denki Kagaku Kogyo K.K.) | 70 parts by weight |
| Polycaprolactone (molecular weight: 10,000) ("PLACCEL H-1P" manufactured by Dicel Chemical Industries, Ltd.) | 30 parts by weight |
| Amino-modified silicone ("KF-393" manufactured by Shin-Etsu Chemical Co., Ltd.) | 3 parts by weight |
| Epoxy-modified silicone ("X-22-343" manufactured by Shin-Etsu Chemical Co., Ltd.) | 3 parts by weight |
| Toluene | 300 parts by weight |
| Methyl ethyl ketone | 300 parts by weight |
| (Coating Liquid A for Forming Backing Layer) | |
| Acrylic Polyol Resin ("Acrydic A-801P" manufactured by Dainippon Ink & Chemical, Inc.) | 20 parts by weight |
| Fine Particles of Polyamide Resin ("Orgasol 2002" manufactured by Nippon Rirusan Co., Ltd.) | 0.5 parts by weight |
| Butyl Acetate | 400 parts by weight |
| Toluene | 400 parts by weight |
| (Coating Liquid B for Forming Backing Layer) | |
| Acrylic Polyol Resin ("Acrydic 47-538" manufactured by Dainippon Ink & Chemical, Inc.) | 30 parts by weight |
| Nylon 12 Filler ("MW-330" manufactured by Shinto Paint Co., Ltd.) | 0.08 parts by weight |
| Methyl Ethyl Ketone | 30 parts by weight |
| Toluene | 30 parts by weight |
| Butyl Acetate | 10 parts by weight |
| (Coating Liquid C for Forming Backing Layer) | |
| Acrylic Polyol Resin ("Acrydic 47-538" manufactured by Dainippon Ink & Chemical, Inc.) | 30 parts by weight |
| Isocyanate Curing Agent ("Takenate A-14" Takeda Chemical Industries, Ltd.) | 3 parts by weight |
| Nylon 12 Filler ("MW-330" manufactured by | 0.08 parts by weight |

-continued

| | |
|---|---|
| Shinto Paint Co., Ltd.) | |
| Catalyst ("S-CAT24" manufactured by Sankyo Organic Chemicals Co., Ltd.) | 0.15 parts by weight |
| Methyl Ethyl Ketone | 30 parts by weight |
| Toluene | 30 parts by weight |
| Butyl Acetate | 10 parts by weight |
| (Coating Liquid D for Forming Backing Layer) | |
| Acrylic Polyol Resin ("Acrydic 47-538" manufactured by Dainippon Ink & Chemical, Inc.) | 30 parts by weight |
| Isocyanate Curing Agent ("Takenate A-14" Takeda Chemical Industries, Ltd.) | 3 parts by weight |
| Silica Fine Particles ("Sysilia 310" manufactured by Fuji Silysia Chemical, Ltd.) | 0.05 parts by weight |
| Catalyst ("S-CAT24" manufactured by Sankyo Organic Chemicals, Co., Ltd. | 0.05 parts by weight |
| Methyl Ethyl Ketone | 30 parts by weight |
| Toluene | 30 parts by weight |
| Butyl Acetate | 10 parts by weight |

By using the above-described coating liquids, thermal transfer image-receiving sheets were prepared. Specifically, a dye-receptive layer having a predetermined composition was formed, by the roll coating method, on the surface of a transparent substrate sheet, a polyethylene terephthalate film having a thickness of 100 micrometers ("Lumirror" manufactured by Toray Industries, Inc.). The amount of the coating liquid coated onto the substrate sheet to form the dye-receptive layer was 3.5 g/m$^2$ on dry basis. A backing layer having a predetermined composition was formed, by means of gravure printing, on the other surface of the substrate sheet. The amount of the coating liquid coated onto the substrate sheet to form the backing layer was 4.0 g/m$^2$ on dry basis.

EXAMPLE 1

The above coating liquid 1 for forming dye-receptive layer was coated onto the surface of the substrate sheet in an amount of 3.5 g/m$^2$ on dry basis, thereby forming a dye-receptive layer. The above coating liquid A for forming backing layer was then coated onto the other surface of the substrate sheet in an amount of 4.0 g/m$^2$ on dry basis, thereby forming a backing layer. Thus, a thermal transfer image-receiving sheet of Example 1 was obtained.

EXAMPLE 2

A thermal transfer image-receiving sheet of Example 2 was prepared in the same manner as in Example 1 except that the coating liquid 2 for forming dye-receiving layer and the coating liquid B for forming backing layer were used for forming a dye-receptive layer and a backing layer, respectively.

EXAMPLE 3

A thermal transfer image-receiving sheet of Example 3 was prepared in the same manner as in Example 1 except that the coating liquid 3 for forming dye-receptive layer and the coating liquid C for forming backing layer were used for forming a dye-receptive layer and a backing layer, respectively.

EXAMPLE 4

A thermal transfer image-receiving sheet of Example 4 was prepared in the same manner as in Example 1 except that the coating liquid 4 for forming dye-receptive layer and the coating liquid D for forming backing layer were used for forming a dye-receptive layer and a backing layer, respectively.

COMPARATIVE EXAMPLE 1

A thermal transfer image-receiving sheet of Comparative Example 1 was prepared in the same manner as in Example 1 except that the coating liquid 5 for forming dye-receptive layer was used for forming a dye-receptive layer and that a backing layer was not provided.

COMPARATIVE EXAMPLE 2

A thermal transfer image-receiving sheet of Comparative Example 2 was prepared in the same manner as in Example 1 except that the coating liquid 6 for forming dye-receptive layer was used for forming a dye-receptive layer and that a backing layer was not provided.

COMPARATIVE EXAMPLE 3

A thermal transfer image-receiving sheet of Comparative Example 3 was prepared in the same manner as in Example 1 except that the coating liquid 7 for forming dye-receptive layer was used for forming a dye-receptive layer and that a backing layer was not provided.

COMPARATIVE EXAMPLE 4

A thermal transfer image-receiving sheet of Comparative Example 4 was prepared in the same manner as in Example 1 except that the coating liquid 8 for forming dye-receptive layer was used for forming a dye-receptive layer and that a backing layer was not provided.

Each one of the above-obtained thermal transfer image-receiving sheets was placed on a commercially available sublimation layer of the image-receiving sheet with the dye-receptive layer of the image-receiving sheet and the dye layer of the printing sheet faced each other. Heat was applied to the back surface of the thermal transfer printing sheet by a thermal head.

By using a printer capable of controlling 256 steps of gradation, equipped with a thermal head having a line density of 300 dpi, a 16-step pattern with the gradation evenly divided between 0 and 255 steps was printed on the image-receiving sheet in each color of yellow, magenta, cyan, and black which was obtained by superposing the three colors of yellow, magenta and cyan. The printing speed was 10 msec/line, and the maximum energy applied was 0.65 mj/dot on the 16th step.

By using two sheets of each one of the thermal transfer image-receiving sheets of Examples and Comparative Examples, the friction coefficient of the image-receiving sheet was determined in accordance with the following method:

The two sheets of each thermal transfer image-receiving sheet in the same direction were brought into contact with each other at each short side thereof so that the dye-receptive layer of one sheet would be faced with the backing layer of the other sheet. The contact area was 10 cm×5 cm. The tensile force F of this sample was measured on a plane measurement base by using a crosshead at a stress rate of 500 mm/min under a load of 2 kg, and the friction coefficient was obtained by dividing the tensile force F by 2 kg of the load. It is noted that one of the sheets was fixed on the plate measurement base with its dye-receptive layer downward, whereas the other sheet was adhered to a plate of 10 cm×5 cm so that its dye-receptive layer would be exposed. A Tensilon was used as the measuring apparatus, and a 5 kg rated cell was used as the load cell.

Further, 10 sheets of each one of the thermal transfer image-receiving sheets of Examples and Comparative Examples were placed in the tray of the printer. Printing was continuously carried out by automatically feeding the sheets in order to examine the feeding properties of the thermal transfer image-receiving sheet.

The feeding properties of each thermal transfer image-receiving sheet was evaluated in accordance with the following criteria:

◎: Neither jamming nor double feed of the sheets was caused at all.

X: Jamming and/or double feed of the sheets was caused.

Next, the transmittance density and the matting of the dye-receptive layer were evaluated by using the 16th step of each color. The transmittance density was measured by a Macbeth transmittance densitometer. The matting of the surface of the dye-receptive layer was evaluated by visually observing the color of the image projected by an OHP as to whether it looked darkened or not. The criteria for this evaluation were as follows:

◎: Neither darkening nor matting was observed in each color.

•: Matting was slightly observed only in black color produced by superposing the three colors. However, no darkening was found in the image projected by an OHP.

Δ: Matting was slightly observed in each color, and darkening was also slightly found in the image of each color projected by an OHP.

X: Matting was observed in the steps of gradation lower than the 16th step, and darkening was also found in the image projected by an OHP.

(Results of Evaluations)

The results of the above evaluations are shown in the below Table 1.

TABLE 1

| | Friction Coefficient | Feeding Properties | Transmittance Density | Matting |
|---|---|---|---|---|
| Example 1 | 0.30 | ○ | 1.47 | ○ |
| Example 1 | 0.26 | ○ | 1.65 | ◎ |
| Example 3 | 0.27 | ○ | 1.62 | ◎ |
| Example 4 | 0.25 | ○ | 1.65 | ◎ |
| Comp. Ex. 1 | 0.65 | x | 1.23 | Δ |
| Comp. Ex. 2 | 0.66 | x | 1.25 | Δ |
| Comp. Ex. 3 | 0.61 | x | 1.59 | x |
| Comp. Ex. 4 | 0.62 | x | 1.60 | x |

As is clear from the above results, the dye-receptive layers of Examples 1 to 4, containing polycaprolactone had images having densities (transmittance densities) higher than those of the images produced on the dye-receptive layers of Comparative Examples 1 to 4, and also brought about good results in terms of the matting of the surface thereof.

Moreover, the thermal transfer image-receiving sheets of Examples 1 to 4 did not cause jamming when sheets of these image-receiving sheets were fed to the printer. On the other hand, the thermal transfer image-receiving sheets of Comparative Examples 1 to 4 caused jamming and double feed when sheets of these image-receiving sheets were fed to the printer.

What is claimed is:

1. A thermal transfer image-receiving sheet comprising:

a substrate sheet;

a dye-receptive layer provided on at least one surface of the substrate sheet, and a backing layer provided on the other surface of the substrate sheet, wherein the dye-receptive layer contains polycaprolactone and the backing sheet comprises an acrylic polyol.

2. The thermal transfer image-receiving sheet according to claim 1, wherein the polycaprolactone has a molecular weight of 40,000 to 100,000.

3. The thermal transfer image-receiving sheet according to claim 1, wherein the dye-receptive layer comprises as a main component a vinyl chloride resin or a vinyl chloride/vinyl acetate copolymer resin.

4. The thermal transfer image-receiving sheet according to claim 1, wherein an antistatic layer is provided between the substrate sheet and the dye-receptive layer.

5. The thermal transfer image-receiving sheet according to claim 1, wherein the backing layer comprises a cured product obtained by reacting the acrylic polyol with an isocyanate compound.

6. The thermal transfer image-receiving sheet according to claim 1, wherein the backing layer further comprises an organic or inorganic filler.

7. The thermal transfer image-receiving sheet according to claim 1, wherein the substrate sheet is transparent.

8. The thermal transfer image-receiving sheet according to claim 1, wherein an intermediate layer comprising a polyolefin, vinyl copolymer, polyurethane or polyamide resin is provided between the substrate sheet and the dye-receptive layer.

9. The thermal transfer image-receiving sheet according to claim 1, wherein an intermediate layer comprising a crosslinked resin is provided between the substrate sheet and the dye-receptive layer.

10. The thermal transfer image-receiving sheet according to claim 8, wherein the intermediate layer further comprises an antistatic agent or a resin having antistatic properties.

11. The thermal transfer image-receiving sheet according to claim 1, wherein the acrylic polyol is a polymer of a methacrylate ester of a polyol selected from the group consisting of ethylene glycol, propylene glycol, trimethylene glycol, butanediol, pentanediol, hexanediol, cyclopentanediol, cyclohexanediol and glycerin.

12. The thermal transfer image-receiving sheet according to claim 11, wherein the acrylic polyol has 15 to 55 OH groups.

* * * * *